United States Patent
Suzuki et al.

(10) Patent No.: US 7,239,936 B2
(45) Date of Patent: Jul. 3, 2007

(54) NUMERICAL CONTROL SYSTEM

(75) Inventors: Koji Suzuki, Yamanashi (JP); Toshiyuki Ogata, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 0 days.

(21) Appl. No.: 11/397,624

(22) Filed: Apr. 5, 2006

(65) Prior Publication Data

US 2006/0229760 A1 Oct. 12, 2006

(30) Foreign Application Priority Data

Apr. 7, 2005 (JP) ............................. 2005/111166

(51) Int. Cl.
*G06F 19/00* (2006.01)
(52) U.S. Cl. ........................ 700/159; 700/180; 709/213
(58) Field of Classification Search ................ 700/159, 700/169, 179, 180, 182; 709/201, 212, 213, 709/214, 216
See application file for complete search history.

(56) References Cited

U.S. PATENT DOCUMENTS

| | | | |
|---|---|---|---|
| 6,269,283 B1 * | 7/2001 | Shinozaki et al. .......... | 700/180 |
| 6,349,237 B1 * | 2/2002 | Koren et al. ................ | 700/96 |
| 6,438,444 B1 * | 8/2002 | Mizuno et al. ............. | 700/169 |
| 6,470,377 B1 * | 10/2002 | Sevcik et al. ............... | 709/201 |
| 6,502,007 B1 * | 12/2002 | Kanamoto et al. .......... | 700/173 |
| 6,584,373 B1 * | 6/2003 | Guenther et al. ........... | 700/180 |
| 6,834,214 B2 * | 12/2004 | Davison et al. ............. | 700/169 |
| 7,043,332 B1 * | 5/2006 | Fujinawa et al. ........... | 700/159 |
| 7,089,300 B1 * | 8/2006 | Birse et al. ................. | 709/221 |
| 2002/0193905 A1 * | 12/2002 | Davison et al. ............. | 700/180 |
| 2004/0153526 A1 * | 8/2004 | Haun et al. ................. | 709/217 |
| 2004/0236462 A1 * | 11/2004 | Takeshita et al. ........... | 700/175 |

FOREIGN PATENT DOCUMENTS

JP 07-248813 9/1995

* cited by examiner

*Primary Examiner*—Leo Picard
*Assistant Examiner*—Charles Kasenge
(74) *Attorney, Agent, or Firm*—Staas & Halsey LLP

(57) ABSTRACT

When the system is powered on, a BOOT device detecting unit detects which data exchange device (memory card or the like) is to be booted first, and the detected data exchange device is booted first. A data exchange process program which is set as software starting at BOOT is started to detect a data exchange file. At this time, with reference to a type code of a numerical control apparatus to be used, data matched to the type code is selected. A data exchange file is transferred to an internal storing device to which the data exchange device is connected. Then, a data exchange file is transferred to an internal storing device to which the data exchange device is not connected.

4 Claims, 6 Drawing Sheets

CONFIGURATION OF SOFTWARE FOR MMC PART

CONFIGURATION OF SOFTWARE FOR CNC PART

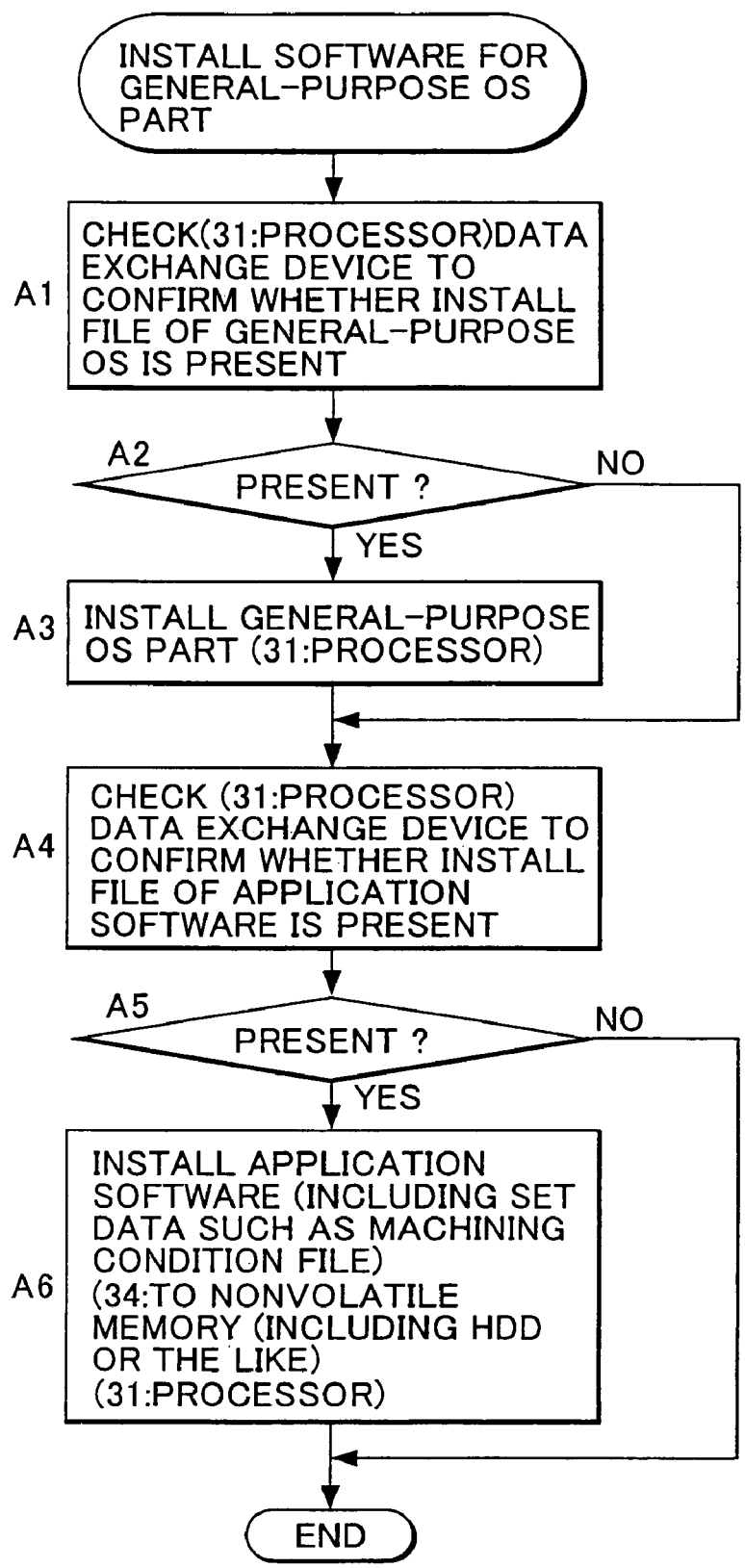

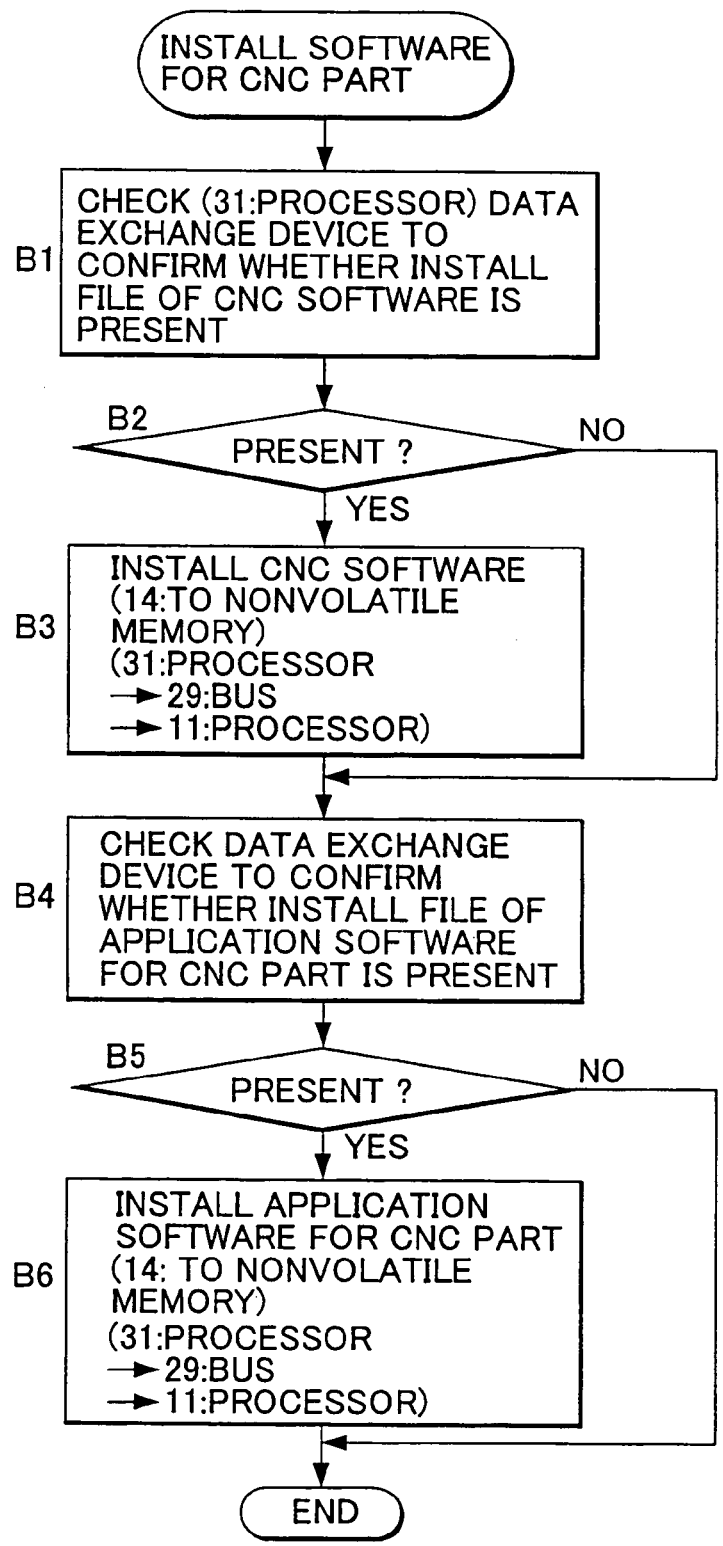

NUMERICAL CONTROL SYSTEM

BACKGROUND OF THE INVENTION

1. Field of the Invention

The present invention relates to a numerical control system to control an automatic machine such as a machine tool, more particularly, to a numerical control system comprising a general-purpose computer which executes a general-purpose OS (Operation System) to performs processing of a user interface and a numerical control apparatus which executes CNC software to control an automatic machine.

2. Description of the Related Art

In general, the numerical control system to control a machine tool has a man-machine controller and a numerical control apparatus (CNC). The configuration of software of the numerical control system is roughly classified into software in the man-machine controller and software in the numerical control apparatus. A general-purpose computer is used in the man-machine controller. The general-purpose computer executes a general-purpose OS including an application program to perform processing of a user interface. On the other hand, in the numerical control apparatus, CNC software is executed to control an object to be controlled (automatic machine such as a machine tool).

More specifically, software on the man-machine controller (MMC) side is constituted by an OS such as Windows (registered trademark) and pieces of application software. The software in the CNC is constituted by an OS such as BOOT (booting software), basic software for each numerical control apparatus, servo software, PMC (programmable machine controller) software, pieces of application software, and the like.

When pieces of software to be used in the MMC and the CNC are installed in the MMC and the CNC freshly or for data exchange, conventionally, general-purpose OS (used in the MMC) including application software and CNC software must be separately transferred from a data exchange device using an HDD or a memory card to the MMC and the CNC by dedicated operations, respectively. Pieces of software to be installed vary often depending on the types of numerical control apparatuses. However, it has not been designed to automatically select and install software depending on the type of a numerical control apparatus.

Furthermore, it has not been designed to set a parameter automatically for every application required after transfer. Similarly, as in a wire-cut electric discharge machine, machining conditions are generally changed when processing control software is changed, or processing conditions such as feed rate control may be changed as in a machining center. In this case, unless another processing condition is installed, the machine or the machining center cannot cope with the change of the machining conditions.

In an installer of Windows (registered trademark), as one example of prior art, control variables of a general-purpose computer and/or a numerical control apparatus are set by an application program to be installed. In this case, since the control variables to be set generally vary depending on an edition number of software, a program for installation must be corrected in accordance with the contents of software to be installed.

The conventional technique related to the present invention is disclosed in Japanese Patent Application Laid-Open No. 7-248813. This patent document discloses carrying out automatic data transfer from a data exchange device when a numerical control apparatus is powered on. However, this patent document does not suggest automatic execution of the transfer of required data to an MMC and the transfer of required data to a CNC in the lump.

SUMMARY OF THE INVENTION

It is an object of the present invention to provide a numerical control system which make it possible to automatically transfer a general-purpose OS including an, application and CNC software from one data exchange device. It is another object of the present invention to provide a numerical control system which can automatically select and install software depending on a type of a numerical control apparatus. It is still another object of the present invention to provide a numerical control system which can automatically perform variable operation such as parameter setting for every application and installing of machining conditions by means of application software transferred from the data exchange device subsequent to the above-described automatic transfer.

In this manner, the present invention relates to an improvement of a numerical control system which allows to automatically install a general-purpose OS and CNC software and set a parameter with a required minimum operation.

The present invention, in order to achieve the above object, makes it possible to install software from any one of general-purpose computer and a numerical control apparatus in a numerical control system, to which a data exchange device is connected, to the other of these general-purpose computer and a numerical control apparatus to which the data exchange device is not connected. In this case, in data transfer from the general-purpose computer to the numerical control apparatus or from the numerical control apparatus to the general-purpose computer, a bus which connects the numerical control apparatus to the general-purpose computer can be used.

In the present invention, a numerical control system comprises an identifying unit which identifies a type of a numerical control apparatus by a boot program to be executed when the system is started up, enabling an automatic selection and installation of software according to the type of the numerical control apparatus.

Furthermore, in the present invention, control variables are set by an installed application program to make it unnecessary to correct software for installation in accordance with an edition number of software. An application program to be installed has a function to set a control variable which is also used when software is changed, as in the case of conventional art, and an existing function can be used in setting itself of the control variable.

The present invention relates to a numerical control system including general-purpose computer which executes a general-purpose OS to perform processing of a user interface and a numerical control apparatus which executes CNC software to control an automatic machine. The numerical control system includes a data exchange device in which a general-purpose OS, CNC software, and a data exchange process program are stored. When the numeral control system is started up, the data exchange process program stored in the data exchange device is executed, and the general-purpose OS and the CNC software are transferred to the internal storing devices of the general-purpose computer and the numerical control apparatus, respectively, on the basis of the data exchange process program.

In this case, the numerical control system may comprise an identifying unit which identifies a type of a numerical control apparatus by means of a boot program to be executed when the system is started up. The corresponding CNC software and/or the general-purpose OS are selected from pieces of CNC software or the general-purpose OS stored in the data exchange device by the identifying unit, so that the selected software can be transferred to the internal storing devices in the numerical control apparatus and/or the general-purpose computer.

An application program is further stored in the data exchange device, and the application program is transferred to the general-purpose computer and/or the numerical control apparatus when the system is started up, so that control variables of the general-purpose computer and/or the numerical control apparatus are set by executing the application program.

A machining condition and an operation condition for causing an object to be controlled by the numerical control apparatus to perform machining or an operation are further stored in the data exchange device, and the machining condition and the operation condition are transferred to the general-purpose computer and/or the numerical control apparatus when the numerical control system is started up.

According to the present invention, installation of both a general-purpose OS and CNC software, setting of parameters, and the like can be automatically performed by a simple operation. First, the data exchange device is connected to any one of the general-purpose computer and the numerical control apparatus to make it possible to install software required for any one of the general-purpose computer and the numerical control apparatus.

Even in case where the data exchange apparatus is connected to the general-purpose computer, an identifying unit which identifies a type of the numerical control apparatus by a boot program to be executed when the system is started up is arranged so that the type of the numerical control apparatus can be identified.

Furthermore, a control variable is set by the installed application program to make it unnecessary to correct software for installation in accordance with an edition number of the software. As the application program to be installed has a conventional function to set a control variable to be also used when software is changed, it is possible to improve reliability and to reduce the number of operation steps for correcting the software by using existing functions.

BRIEF DESCRIPTION OF THE DRAWINGS

The above and other objects and characteristics of the present invention will be apparent from the following explanation of an embodiment with reference to the accompanying drawings. Of these drawings;

FIG. 6 is a flow chart for showing processes in step S4 shown in FIG. 3; and

FIG. 7 is a flow chart for showing processes in step S5 shown in FIG. 3.

DETAILED DESCRIPTION OF THE PREFERRED EMBODIMENTS

Figure 1:
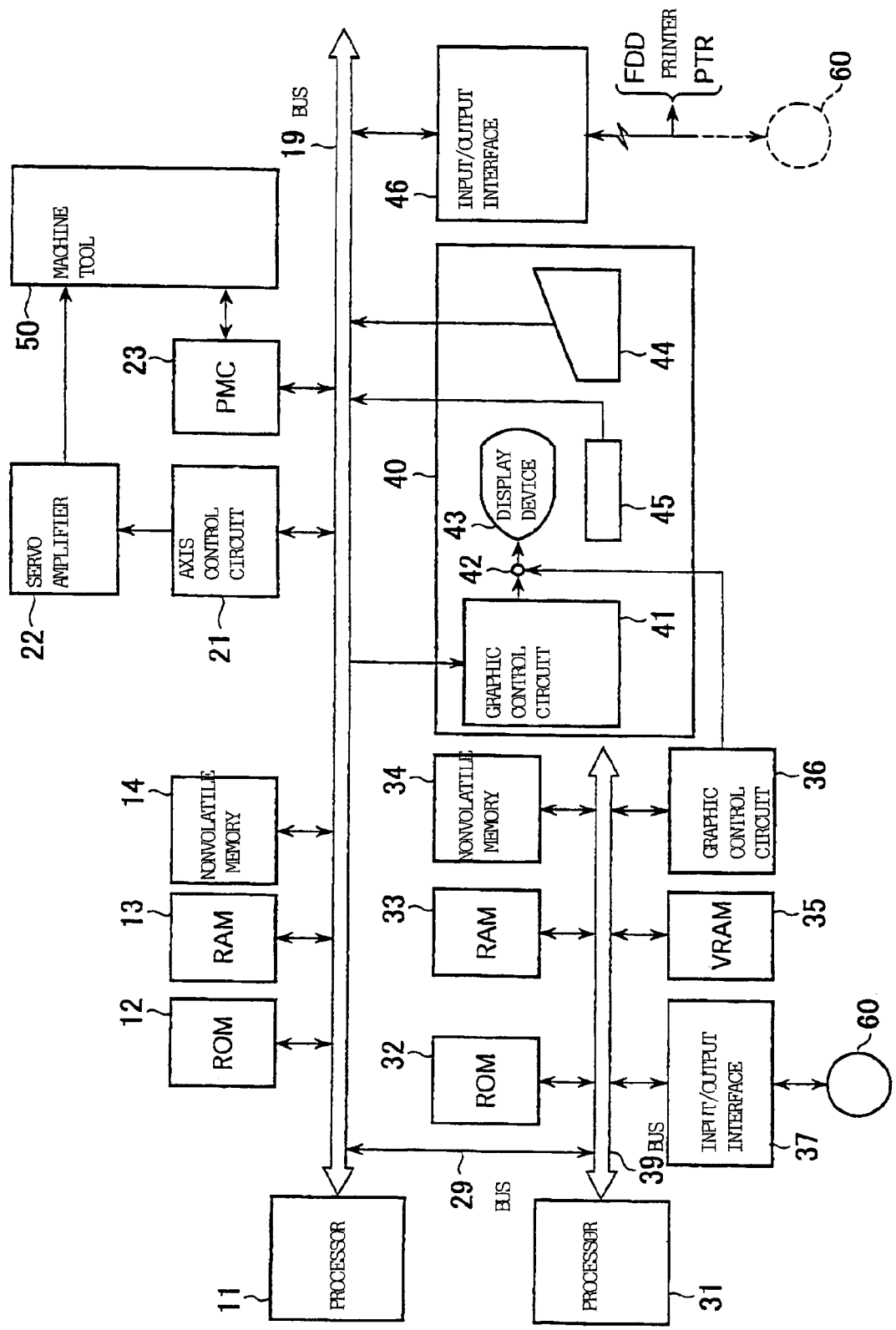
FIG. 1 is a diagram showing the entire configuration of an embodiment of a numerical control system according to the present invention.

FIG. 1 is a diagram showing the entire configuration of one embodiment of a numerical control system according to the present invention.

The numerical control system is roughly constituted by a numerical control unit and a man-machine controller unit. Reference numeral 11 denotes a processor (CPU) which integrally controls respective parts of the numerical control unit. To the processor 11, through a bus 19, various devices, i.e., a ROM 12, a RAM 13, a nonvolatile memory 14, an axis control circuit 21, a PMC 23, a graphic control circuit 41, a display device (CRT) 43, a keyboard 44, a software key 45, and an input/output interface 46 are connected.

The processor 11 entirely controls the numerical control unit according to a system program stored in the ROM 12. Various data or input/output signals are stored in the RAM 13.

A memory using a CMOS is used as the nonvolatile memory 14 and backed up by a battery. Parameters, a pitch error correction amount, a tool error correction amount, and the like which should be held even in a power-off state are stored in the nonvolatile memory 14. The nonvolatile memory 14 is used as an "internal memory in the numerical control unit" in internal processing to be executed when the system is started up (as described later).

The axis control circuit 21 receives movement command from the processor 11 and outputs the movement command to a servo amplifier 22. The servo amplifier 22 receives the movement command to cause an automatic machine (machine tool 50 in this case) to drive a servo motor. The PMC 23 receives a T function signal (tool selection command) or the like when executing an NC program. These signals are processed by a sequence program and outputted as an operation command, so that a machine tool 50 is controlled. The PMC 23 receives a state signal from the machine tool 50 to perform a sequence process, and transfers a necessary input signal to the processor 11.

The input/output interface 46 connected to the bus 19 controls inputting/outputting of various data between external devices such as an FDD (floppy disk drive), a printer, and a PTR (paper tape reader). In the embodiment, furthermore, as indicated by a broken line, a memory card read device (or HDD) 60 can be connected to the input/output interface 46 to constitute a data exchange device (as described later).

On the other hand, a reference numeral 31 denotes a processor (CPU) which integrally controls respective parts in the man-machine controller unit. To the processor 31, through a bus 39, various devices, i.e., a ROM 32, a RAM 33, a nonvolatile memory 34, a VRAM 35, a graphic control circuit 36, and an input/output interface 37 are connected. The numerical control unit and the man-machine controller unit are connected to each other by a bus 29. Data send and reception is performed through the bus 29.

In the man-machine controller unit, the processor 31 executes an interactive processing program stored in the ROM 32 to display a work, data, or the like which can be set, on an interactive input screen of the display device 43 of an MDI/CRT (Manual Data Input/Cathode Ray Tube) unit 40, in a menu format. A machining program is formed from the data inputted as described above, and a track, a locus and the like of an overall tool are displayed as a background animation.

Various data or the like for interaction are stored in the RAM 33. As the nonvolatile memory 34, a memory using a CMOS is used. The nonvolatile memory 34 is backed up by a battery. Application program, a processing program, and the like which should be held even in a power-off state are stored in the nonvolatile memory 34. The nonvolatile memory 34 is used as an "internal memory in an MMC" in internal processing to be executed when the system is started up (as described later).

The VRAM (video RAM) 35 is a rapidly accessible RAM, in which Graphic data for animation display in execution of cutting simulation of the machine tool 50 on the basis of a machining program stored in the nonvolatile memory 34 as an NC statement is stored. The graphic control circuit 36 converts graphic data stored in the VRAM 35 into a signal for display to output the signal to the MDI/CRT unit 40. The MDI/CRT unit 40 has a switch designated by reference numeral 42. When the MDI/CRT unit 40 receives a signal from the graphic control circuit 36 or 41, the MDI/CRT unit 40 detects and identifies the signal to transmit the signal to the display device (CRT) 43.

The input/output interface 37 is an interface used for connection of the memory card read device (or HDD) 60 which constitutes a data exchange device (as described later), to the MMC. As described above, the memory card read device (or HDD) 60 can be disconnected from the input/output interface 37 and can be connected to the input/output interface 46 of the CNC. As will be described below, even when the memory card read device (or HDD) 60 is connected to any one of the input/output interfaces 37 and 46, software can be installed in the internal memory (in this case, the nonvolatile memory 14 or 34) of the corresponding one of the input/output interfaces 37 and 46 by internal processing to be executed when the system is started up.

Figure 2:
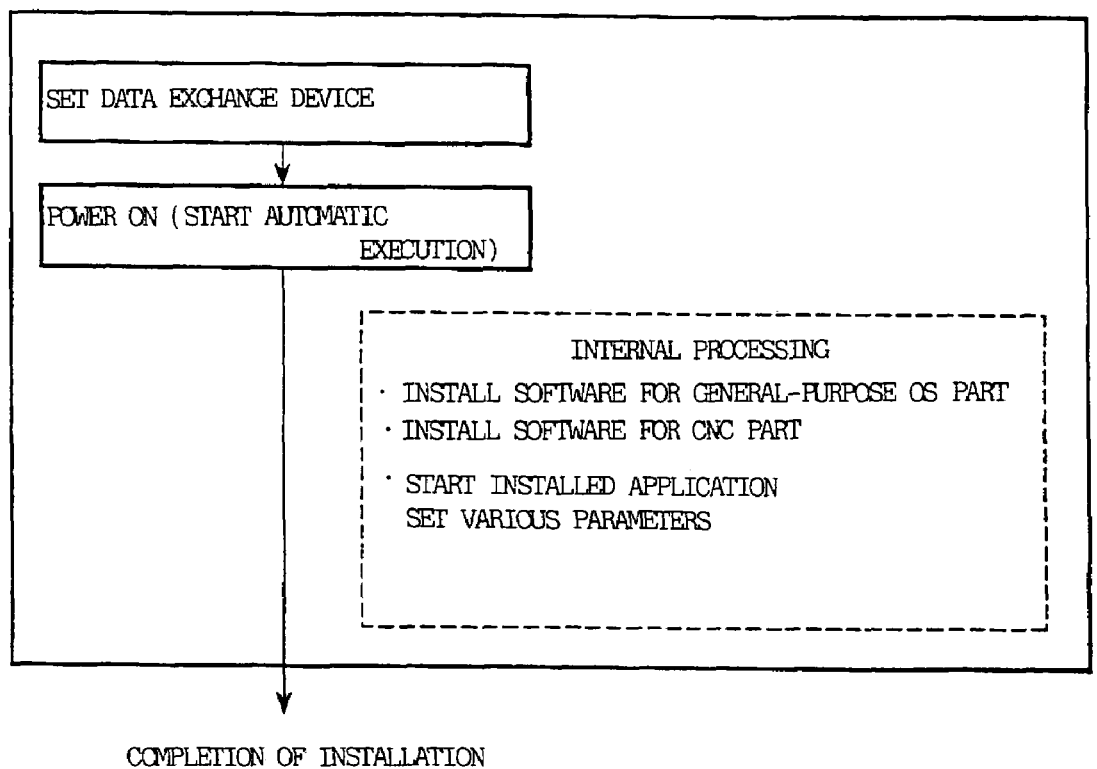
FIG. 2 is a diagram showing an outline of a flow of operations performed when software is installed in the numerical control system in FIG. 1.

An outline of operations when installation is performed by using the numerical control system is shown in FIG. 2. For preparation for installation, first, the data exchange device is set in the MMC or the CNC. In the embodiment, the memory card read device (or HDD) 60 (data exchange device) is connected to the input/output interface 37 or 46 (or to the MMC part). Upon completion of the connection, the system is powered on. Automatic execution of installation is started. More specifically, by internal processing starting from booting (start up), the following processes are executed:

(1) a process of installing (transferring and writing to/in the nonvolatile memory 34 serving as the internal memory in the MMC) software for the general-purpose OS part;
(2) a process of installing (transferring and writing to/in the nonvolatile memory 14 serving as the internal memory in the CNC) software for the CNC part; and
(3) a process of starting an application program installed in the general-purpose OS part to automatically set various parameters (control variables, processing condition data, and the like).

In this manner, an installing operation to be performed when the system is started up is completed. In this case, as methods of preparing (holding) values of various parameters (control variables, processing condition data, and the like) to be set automatically by starting an application program installed in the general-purpose OS part, various cases may be employed depending on the contents of the application program which has a function to automatically set such various parameters.

In general, the values of control variables to be automatically set need not be written in the memory (memory card, hard disk, or the like) of the data exchange device in advance. For example, the values can be held as data to be attached to a processing program in the application program to be installed.

It is known that an application program having a function to automatically set various parameters (control variables, processing condition data, and the like) is included in a general-purpose OS used in the general-purpose OS part.

Figure 3:
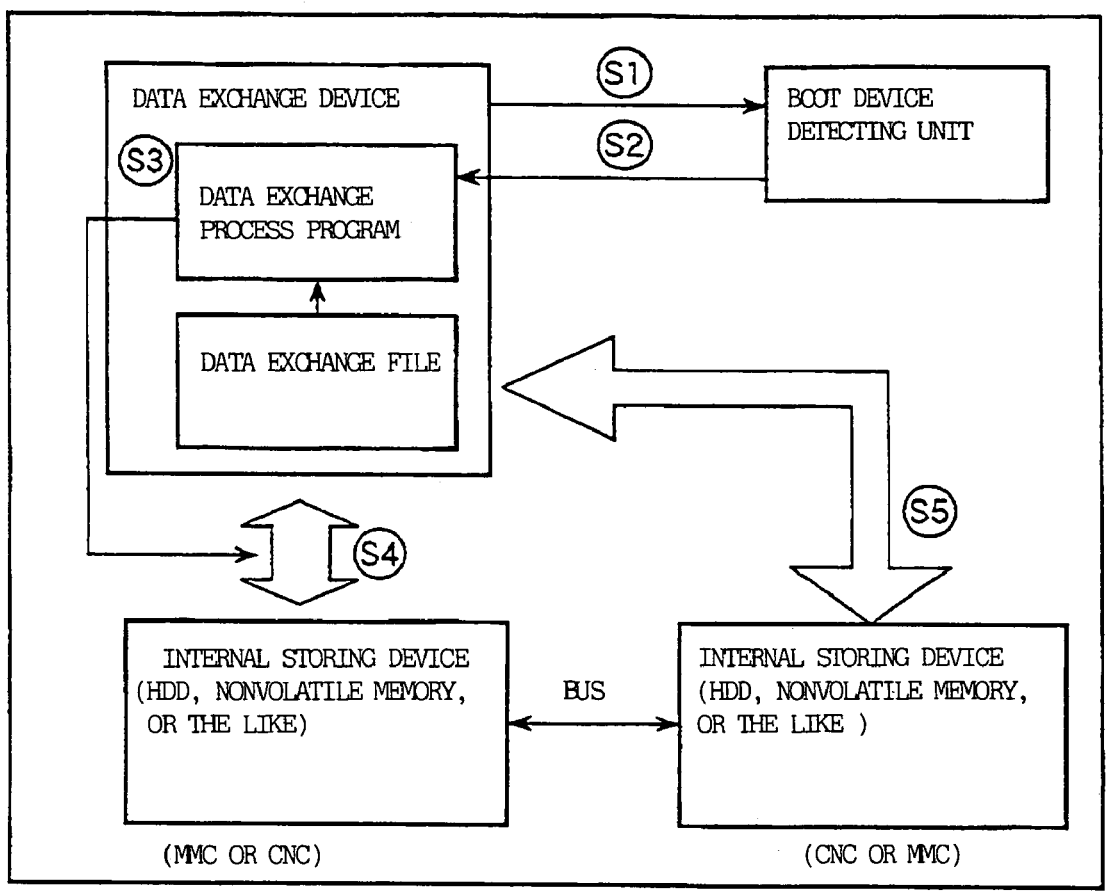
FIG. 3 is a block diagram showing a correlation between elements related to internal processing in the numerical control system in FIG. 1.

FIG. 3 is a block diagram showing a correlation between elements related to the internal processing explained above, in which elements related to steps S1 to S5 of the internal processing are added. In this drawing, the data exchange device is constructed by connecting the memory card read device (or HDD) 60 to the input/output interface 37 or 46, as described above. In a memory card or an HDD, a data exchange process program and a data exchange file are stored in advance. The data exchange file includes data of software for a man-machine controller part and software for a CNC part.

Figure 4:
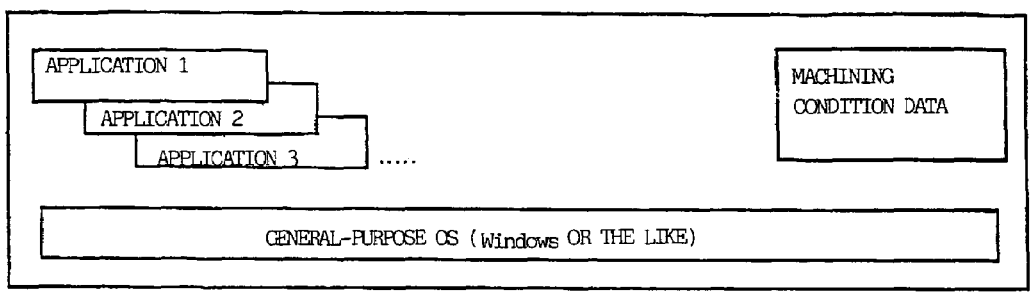
FIG. 4 is a diagram showing a configuration of software for a man-machine controller part in the numerical control system in FIG. 1.
Figure 5:
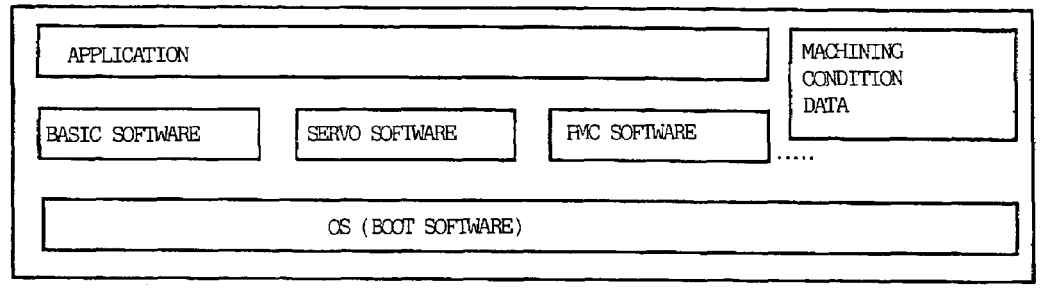
FIG. 5 is a diagram showing a configuration of software for a CNC part in the numerical control system in FIG. 1.

FIG. 4 is a configuration of software for the man-machine controller part. The software includes, in addition to a general-purpose OS such as WINDOWS (registered trademark), various applications 1, 2, 3, . . . , machining condition data, and the like. FIG. 5 is a configuration of software for the CNC part. The software includes basic software (OS) for a CNC, servo software for servo control, PMC software for controlling a PMC, various applications, machining condition data, and the like.

When the type of a numerical control apparatus to be used is considered, identification data corresponding to a type code of the numerical control apparatus is added to (a) various applications 1, 2, 3, . . . , in addition to a general-purpose OS of software for the man-machine controller part, (b) machining condition data, and (c)basic software (OS) for a CNC, servo software for servo control, and PMC software for controlling the PMC, and various applications and machining condition data. For example, when types of numerical control apparatuses are type 1, type 2, and type 3, the data of the pieces of software are labeled with identification data to discriminate data dedicated to type 1, data dedicated to type 2, data dedicated to type 3, data common to types 1 and 2, data common to types 2 and 3, data common to types 3 and 1, and data common to types 1, 2 and 3 from each other. A type code of a numerical control apparatus to be used is written in, for example, the ROM 12 in advance.

Furthermore, software (BOOT software) for a start up process immediately after the system is powered on is included in any one of the MMC part and the CNC part. In this case, the BOOT software is prepared as software for the CNC part. The BOOT software constitutes a BOOT device and a BOOT detecting unit and includes a parameter which determines a device to be booted first. In this case, a setting is performed such that the data exchange device is to be booted first. When the data exchange device is booted first, a data exchange process program is registered as software to be started at a BOOT in advance (AUTOEXEC.BAT (MS-DOS), SETUPIS.EXE (Windows (registered trademark) CE), or the like).

On the above assumption, steps S1 to S5 in FIG. 3 will be briefly described below.

[S1]; When the system is powered on, the BOOT device detecting unit determines which device is to be booted first (function of a BIOS in general).

[S2]; As described above, in this case, the data exchange device (memory card, HDD, or the like) is detected and booted first.

[S3]; A data exchange process program set as software to be started at a BOOT is started.

[S4]; The data exchange process program detects a data exchange file. At this time, a type code of a numerical control apparatus to be used is read from, for example, the ROM 12, and data matched to the type code is selected and employed. For example, if the type of the numerical control apparatus to be used is type 3, then data dedicated to type 1, data dedicated to type 2, data common to types 1 and 2 are excluded, and data dedicated to type 3, data common to types 2 and 3, data common to types 3 and 1, and data common to types 1, 2, and 3 are selected, respectively. The data exchange file is transferred to the internal storing device to which the data exchange device is connected.

For example, when the memory card read device (or HDD) 60 is connected to the input/output interface 37, a process of transferring data of software for the MMC part to the nonvolatile memory 34 and writing the data is executed. When the memory card read device (or HDD) 60 is connected to the input/output interface 46, a process of transferring data of software for the CNC part to the nonvolatile memory 14 and writing the data is executed.

[S5]; Furthermore, the data exchange file is transferred to the internal storing device to which the data exchange device is not connected. For example, when the memory card read device (or HDD) 60 is connected to the input/output interface 37, a process of transferring data of software for the CNC part to the nonvolatile memory 14 and writing the data is executed. When the memory card read device (or HDD) 60 is connected to the input/output interface 46, a process of transferring data of software for the MMC part to the nonvolatile memory 34 and writing the data is executed. The bus line 29 which connects the MMC part to the CNC part is used in data transfer to a destination. Furthermore, a process of starting the application program installed in the general-purpose OS part to automatically set various parameters (control variables, machining condition data, and the like) is executed.

FIGS. 6 and 7 are flowcharts which show processes in steps S4 and S5 in FIG. 5, respectively. Essential points of the respective steps in the flow charts in FIGS. 6 and 7 are as follows. In this case, it is assumed that the data exchange device is connected to the MMC part (input/output interface 37). If the data exchange device is connected to the CNC part (input/output interface 46), step S4 corresponds to the flow chart in FIG. 7, and step S5 corresponds to the flow chart in FIG. 6.

[Flow Chart in FIG. 6]

[A1]; The processor 31 checks the data exchange device (memory card or HDD) to confirm whether an install file of a general-purpose OS is present or not.

[A2]; When the install file of the general-purpose OS is present, the program proceeds to step A3. When the install file is not present, the program proceeds to step A4.

[A3]; The processor 31 installs a general OS portion.

[A4]; The processor 31 checks the data exchange device (memory card or HDD) to confirm whether an install file of the application software is present or not.

[A5]; When the install file of the application software is present, the program proceeds to step A6. When the install file is not present, the process is ended.

[A6]; The processor 31 installs the application software. A file of machining conditions or the like is also stored in the nonvolatile memory 34 (internal storing device in the MMC part, which may be an HDD), and the process is ended.

[Flow Chart in FIG. 7]

[B1]; The processor 31 checks the data exchange device (memory card or HDD) to confirm whether an install file of software for the CNC is present or not.

[B2]; When the install file of the software for the CNC is present, the program proceeds to step B3. When the install file is not present, the program proceeds to step B4.

[B3]; The processor 31 installs the software for the CNC.

[B4]; The processor 31 checks the data exchange device (memory card or HDD) to confirm whether an install file of application software for the CNC part is present or not.

[B5]; When the install file of the application software for the CNC part is present, the program proceeds to step B6. When the install file is not present, the process is ended.

[B6]; A command and data are transmitted from the processor 31 to the processor 11 through the bus 29 to install the application software for the CNC part (write in the nonvolatile memory 14). This is the end of the process.

What is claimed is:

1. A numerical control system including a general-purpose computer which executes a general-purpose OS to perform processing of a user interface and a numerical control apparatus which executes CNC software to control an automatic machine, comprising:

a data exchange device in which the general-purpose OS, the CNC software, and a data exchange process program are stored, wherein the data exchange process program stored in the data exchange device is executed when the numerical control system is started up, and on the basis of the data exchange process program, the general-purpose OS and the CNC software are transferred to internal storing devices in the general-purpose computer and the numerical control apparatus, respectively.

2. The numerical control system according to claim 1, further comprising an identifying unit which identifies a type of the numerical control apparatus by means of a boot program to be executed when the system is started up, wherein the identifying unit selects CNC software and/or a general-purpose OS corresponding to the type of the numerical control apparatus from pieces of CNC software and/or the general-purpose OS which are stored in the data exchange device, and the selected software is transferred to the internal storing devices in the numerical control apparatus and/or the general-purpose computer.

3. The numerical control system according to claim 1, wherein an application program is further stored in the data exchange device, the application program is transferred to the general-purpose computer and/or the numerical control apparatus when the numerical control system is started up, and control variables of the general-purpose computer and/or the numerical control apparatus are set by executing the application program.

4. The numerical control system according to claim 1, wherein a machining condition and an operation condition for causing an object to be controlled by the numerical control apparatus to perform machining or an operation are further stored in the data exchange device, and said machining condition and the operation condition are transferred to the general-purpose computer and/or the numerical control apparatus when the numerical control system is started up.

* * * * *